US012106913B2

(12) United States Patent
Yoshida et al.

(10) Patent No.: US 12,106,913 B2
(45) Date of Patent: Oct. 1, 2024

(54) LIMIT SWITCH

(71) Applicant: OMRON Corporation, Kyoto (JP)

(72) Inventors: Kouhei Yoshida, Kyoto (JP); Kazuyuki Tsukimori, Kyoto (JP); Sho Ogawa, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 137 days.

(21) Appl. No.: 17/942,448

(22) Filed: Sep. 12, 2022

(65) Prior Publication Data

US 2023/0078664 A1 Mar. 16, 2023

(30) Foreign Application Priority Data

Sep. 14, 2021 (JP) ................................. 2021-149591

(51) Int. Cl.
*H01H 21/34* (2006.01)
*H01H 21/48* (2006.01)

(52) U.S. Cl.
CPC ............ *H01H 21/34* (2013.01); *H01H 21/48* (2013.01)

(58) Field of Classification Search
CPC .......... H01H 21/34; H01H 21/48; H01H 3/16; H01H 3/42; H01H 21/285
USPC ............................................................ 200/47
See application file for complete search history.

(56) References Cited

U.S. PATENT DOCUMENTS 3,740,504 A 6/1973 Hipple
5,207,316 A * 5/1993 Sakamoto ............ H01H 21/285 74/569
8,816,226 B2 * 8/2014 Zhou .................... H01H 21/285 200/47
9,865,414 B2 * 1/2018 Tsukimori .............. H01H 21/28
9,928,972 B1 3/2018 Ou et al.
(Continued)

FOREIGN PATENT DOCUMENTS

EP 2874168 A2 5/2015
EP 2874168 A3 8/2015
(Continued)

OTHER PUBLICATIONS

TIPO Office Action/Search Report for corresponding TW Application No. 111129858; Dated Sep. 14, 2023.
(Continued)

*Primary Examiner* — Lheiren Mae A Caroc
(74) *Attorney, Agent, or Firm* — CANTOR COLBURN LLP

(57) ABSTRACT

A limit switch includes: a switch main body; and an operation unit connected to the switch main body. The operation unit includes: a housing; a shaft member, a biasing member; and a plunger. The shaft member includes a shaft body supported by the housing in a manner rotatable from a return position to an operation position around a rotation axis, and a cam. The plunger includes: a plunger body; and at least one contact portion. The at least one contact portion includes a recess positioned on a facing surface facing the at least one protrusion and recessed in a direction moving closer to the switch main body. The recess includes: a first end; a second end; and an inclined surface. The inclined surface is inclined in a direction moving closer to the switch main body as the inclined surface extends from the second end to the first end.

10 Claims, 10 Drawing Sheets

(56) References Cited

U.S. PATENT DOCUMENTS

| | | | |
|---|---|---|---|
| 2014/0374224 A1 | 12/2014 | Takahashi et al. | |
| 2015/0114805 A1* | 4/2015 | Tsukimori | H01H 21/285 200/47 |
| 2016/0189894 A1 | 6/2016 | Tsukimori et al. | |
| 2020/0411258 A1 | 12/2020 | Takahashi et al. | |

FOREIGN PATENT DOCUMENTS

| | | | |
|---|---|---|---|
| JP | 2015204223 | A | 11/2015 |
| TW | 181394 | B | 4/1992 |
| TW | 201939559 | A | 10/2019 |

OTHER PUBLICATIONS

EPO Extended European Search Report for corresponding EP Application No. 22194728.6; Issued on Jan. 26, 2023.

* cited by examiner

LIMIT SWITCH

CROSS REFERENCE TO RELATED APPLICATIONS

The present invention claims priority under 35 U.S.C. § 119 to Japanese Application, 2021-149591, filed on Sep. 14, 2021, the entire contents of which being incorporated herein by reference.

TECHNICAL FIELD

The present disclosure relates to a limit switch.

DESCRIPTION OF THE RELATED ART

Patent Document 1 discloses a limit switch including a housing where an internal switch is housed. The limit switch includes a rotatable shaft that has a cam, and a switch actuating plunger that is moved by rotation of the shaft. As the shaft is rotated, the cam is inclined and causes the switch actuating plunger to move in a direction away from the shaft, so that the internal switch is switched on or off.

CITATION LIST

Patent Document 1: JP 2015-204223 A

SUMMARY

In the limit switch described above, because the cam is disposed radially separated from the central axis of the shaft, when the shaft is rotated and causes the switch actuating plunger to move, a contact portion of the cam that is in contact with the switch actuating plunger sometimes moves from a bottom dead center in a direction approaching the shaft. In such a case, because the switch actuating plunger is moved with the contact portion of the cam from the bottom dead center in the direction moving closer to the shaft, the limit switch may fail to keep the switch actuating plunger at the bottom dead center and may result in instability of the operation of the limit switch.

An object of the present disclosure is to provide a limit switch that is stably operable.

A limit switch according to one example of the present disclosure includes:

a switch main body capable of being switched on and off; and an operation unit connected to the switch main body, wherein the operation unit includes:

a housing, a shaft member that includes a shaft body extending in a first direction from outside of the housing to inside of the housing and supported by the housing in a manner rotatable from a return position to an operation position around a rotation axis that extends in the first direction, and a cam that is disposed on the shaft body positioned inside the housing and that is rotated with the shaft body, a biasing member that is disposed inside the housing and that biases the cam in a second direction intersecting with the first direction and in a direction moving closer to the switch main body, to return the shaft body to the return position; and a plunger that is disposed in a manner facing the cam, between the switch main body and the cam in the second direction inside the housing and that moves in the second direction as the cam is rotated and switches the switch main body on and off, the cam includes:

a cam body with which the biasing member is in contact, at least one protrusion that protrudes from the cam body in a radial direction with respect to the rotation axis and in a direction moving away from the cam body, and that includes a leading edge separated from the cam body in the radial direction and configured to be able to be brought into contact with the plunger, the plunger includes:

a plunger body that faces the cam in the second direction; and at least one contact portion that protrudes from the plunger body toward the cam along the second direction and that is configured to be able to be brought into contact with the at least one protrusion, the at least one contact portion includes a recess that is positioned on a facing surface facing the at least one protrusion, that extends in a third direction intersecting with the first direction and the second direction, and that is recessed in the second direction and in a direction moving closer to the switch main body, and the recess includes:

a first end that is positioned separately from the leading edge in the third direction with respect to a virtual straight line passing through the rotation axis and extending in the second direction, when the shaft body is at the return position, a second end that is positioned in such a manner that the virtual straight line comes to a position between the second end and the first end in the third direction, and that is positioned farther from the virtual straight line than the leading edge in the third direction when the shaft body is at the operation position; and an inclined surface that extends from the second end to the first end in the third direction, and that is inclined in a direction moving closer to the switch main body in the second direction as the inclined surface extends from the second end to the first end in the third direction.

With the limit switch described above, it is possible to implement a limit switch that is stably operable.

DESCRIPTION OF EMBODIMENTS

An example of the present disclosure will be explained with reference to the accompanying drawings. In the following description, terms indicating specific directions or positions (e.g., terms including "up," "down," "right," and "left") are used as necessary, but the use of these terms is intended to facilitate the understanding of the present disclosure with reference to the drawings, and the technical scope of the present disclosure is not limited by the meanings of these terms. In addition, the following description is merely exemplary in nature, and is not intended to limit the present disclosure, and an application and use thereof. Furthermore, the drawings are schematic representations, and ratios between dimensions and the like do not necessarily coincide with the those in the reality.

Figure 1:
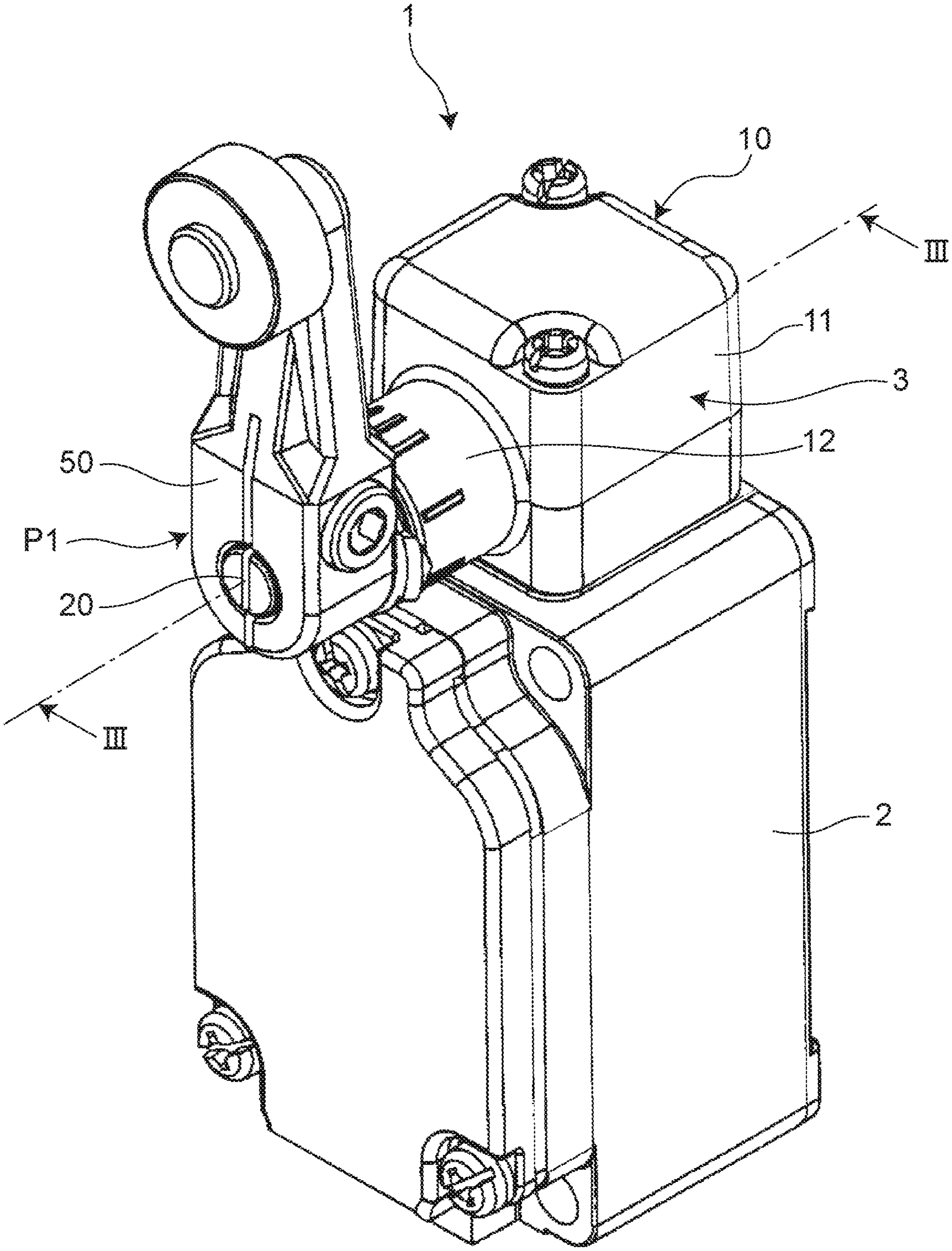
FIG. 1 is a perspective view illustrating a limit switch according to an embodiment of the present disclosure.

As illustrated in FIG. 1, a limit switch 1 according to an embodiment of the present disclosure includes a switch main body 2 capable of being switched on and off, and an operation unit 3 connected to the switch main body 2.

As an example, the switch main body 2 has a substantially cuboid shape, as illustrated in FIG. 1. The operation unit 3 is detachably connected to one surface of the switch main body 2.

Figure 3:
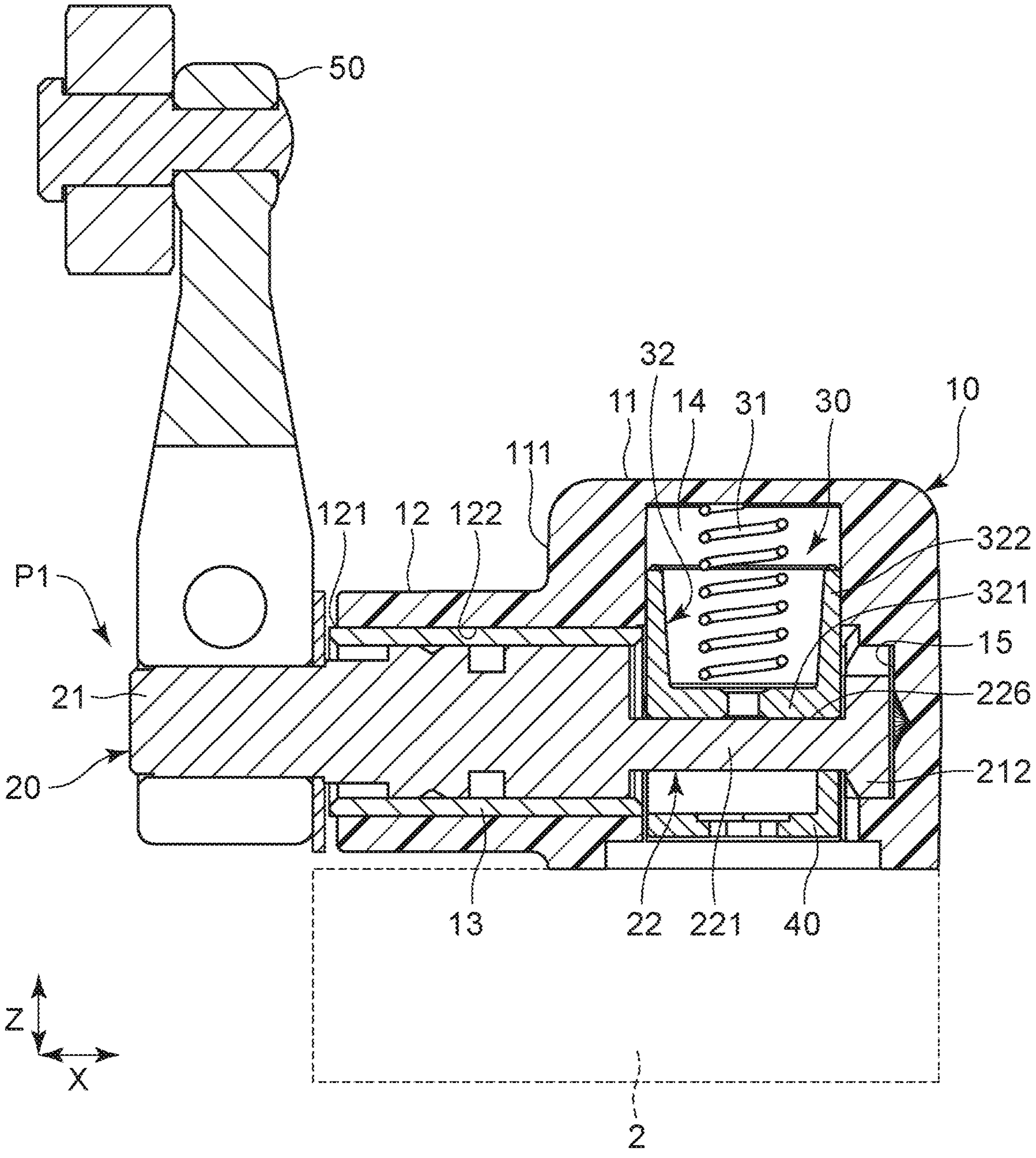
FIG. 3 is a cross-sectional view across the line of FIG. 1.

The operation unit 3 includes a housing 10, a shaft member 20, a biasing member 30, and a plunger 40. As illustrated in FIG. 3, the shaft member 20 extends from outside of the housing 10 to inside of the housing 10 along a first direction (e.g., in an X direction). The biasing member 30 and the plunger 40 are disposed inside the housing 10.

Figure 2:
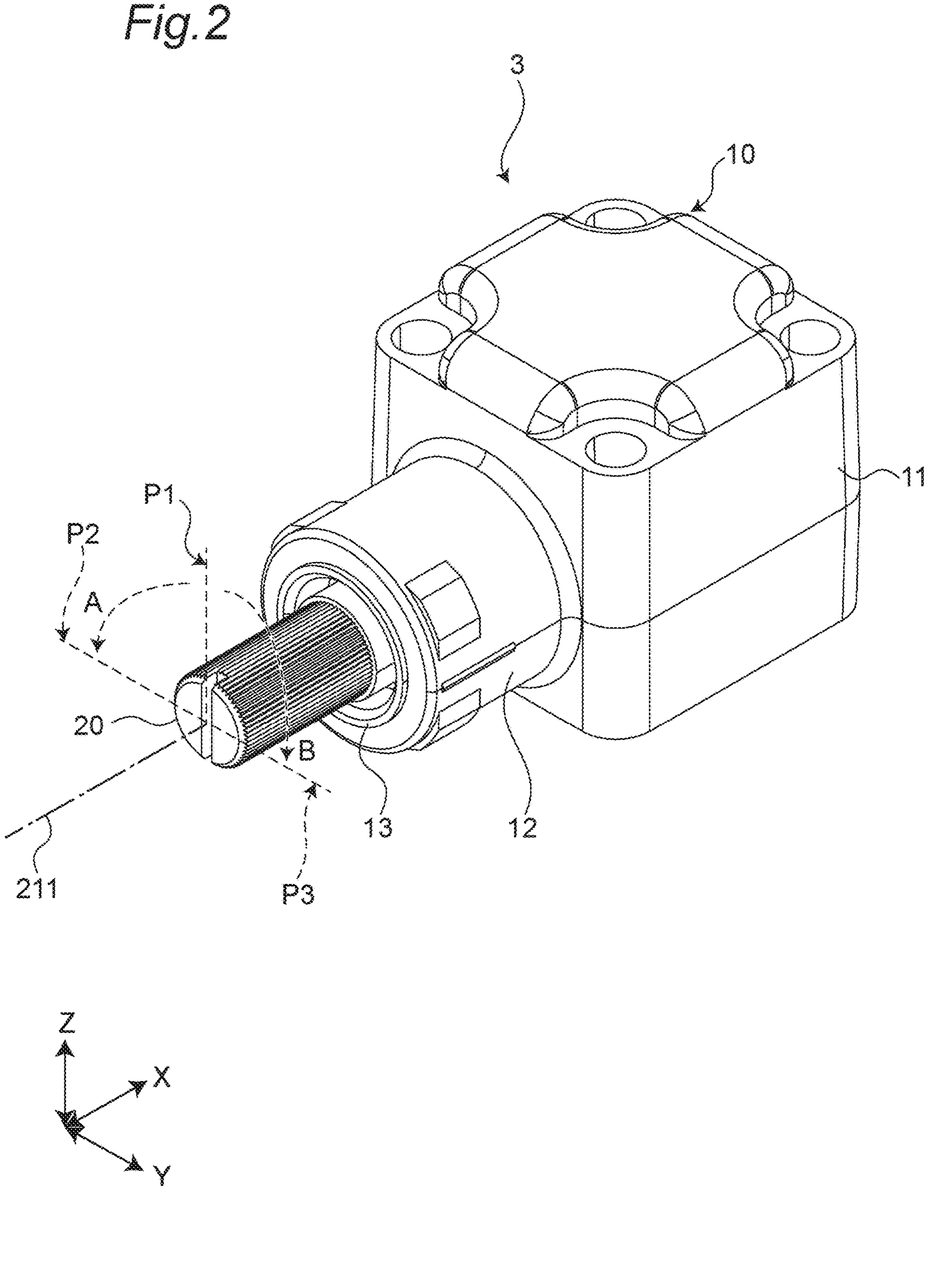
FIG. 2 is a perspective view illustrating an operation unit of the limit switch of FIG. 1.

As illustrated in FIG. 2, the housing 10 includes, as an example, a hollow housing main body 11 having a substantially cubic shape and a circumferential wall portion 12 having a substantially cylindrical shape. The circumferential wall portion 12 is disposed on one of the side surfaces 111 of the housing main body 11, the one being a side surface that is adjacent to the side surface facing the switch main body 2.

The housing main body 11 is connected to the switch main body 2, and a bearing 13 and a housing space 14 are provided inside the housing main body 11, as illustrated in FIG. 3. The bearing 13 is disposed inside a through hole 122, which will be described later, and rotatably supports the shaft member 20. The housing space 14 houses the biasing member 30 and the plunger 40.

The housing main body 11 includes a recess 15 provided on an inner wall by which the housing space 14 is formed. The recess 15 is disposed in a manner facing the through hole 122 in the first direction (e.g., in the X direction), and is recessed from the housing space 14 in the first direction X and in the direction moving away from the circumferential wall portion 12.

The circumferential wall portion 12 extends from the side surface 111 of the housing main body 11 in a direction intersecting with the side surface 111 (e.g., in the X direction in FIG. 3). The circumferential wall portion 12 includes an opening 121 that is provided to a surface that is on a distal side from the housing main body 11 in the X direction, and a through hole 122 that extends in the X direction in an inside of the circumferential wall portion 12 and that is connected to the housing space 14 and to the opening 121.

As illustrated in FIG. 3, the shaft member 20 includes a shaft body 21 and a cam 22. The cam 22 is disposed on the shaft body 21 that is positioned inside the housing 10, and rotates with the shaft body 21 around the rotation axis 211 extending in the first direction X. In the present embodiment, an operation lever 50 is connected to an end of the shaft body 21, the end being positioned outside the housing 10. As an example, as illustrated in FIG. 1, the operation lever 50 extends in a direction intersecting with (e.g., orthogonal to) the shaft member 20, and is rotatable with the shaft body 21.

The shaft body 21 has a substantially cylindrical shape, for example, and extends from the outside of the housing 10 to the inside of the housing 10 along the first direction X. The housing 10 rotatably supports the shaft body 21 around the rotation axis 211 from a return position P1 (see FIG. 2) to a first operation position P2 (see FIG. 2) and a second operation position P3 (see FIG. 2). An end 212 of the shaft body 21, the end 212 being positioned inside the housing 10, is housed in the recess 15 of the housing main body 11.

In the present embodiment, as an example, the shaft body 21 is configured to be rotatable forwardly and reversely. As illustrated in FIG. 2, the rotation in the direction from the return position P1 toward the first operation position P2 around the rotation axis 211 (that is, the direction of the arrow A) is defined as forward rotation, and the rotation in the direction from the return position P1 toward the second operation position P3 that is on the opposite side of the first operation position P2 with respect to the return position P1 (that is, the direction of the arrow B) is defined as reverse rotation. In FIG. 2, the center line of the operation lever 50 at each of these positions is indicated by a dotted line.

Figure 4:
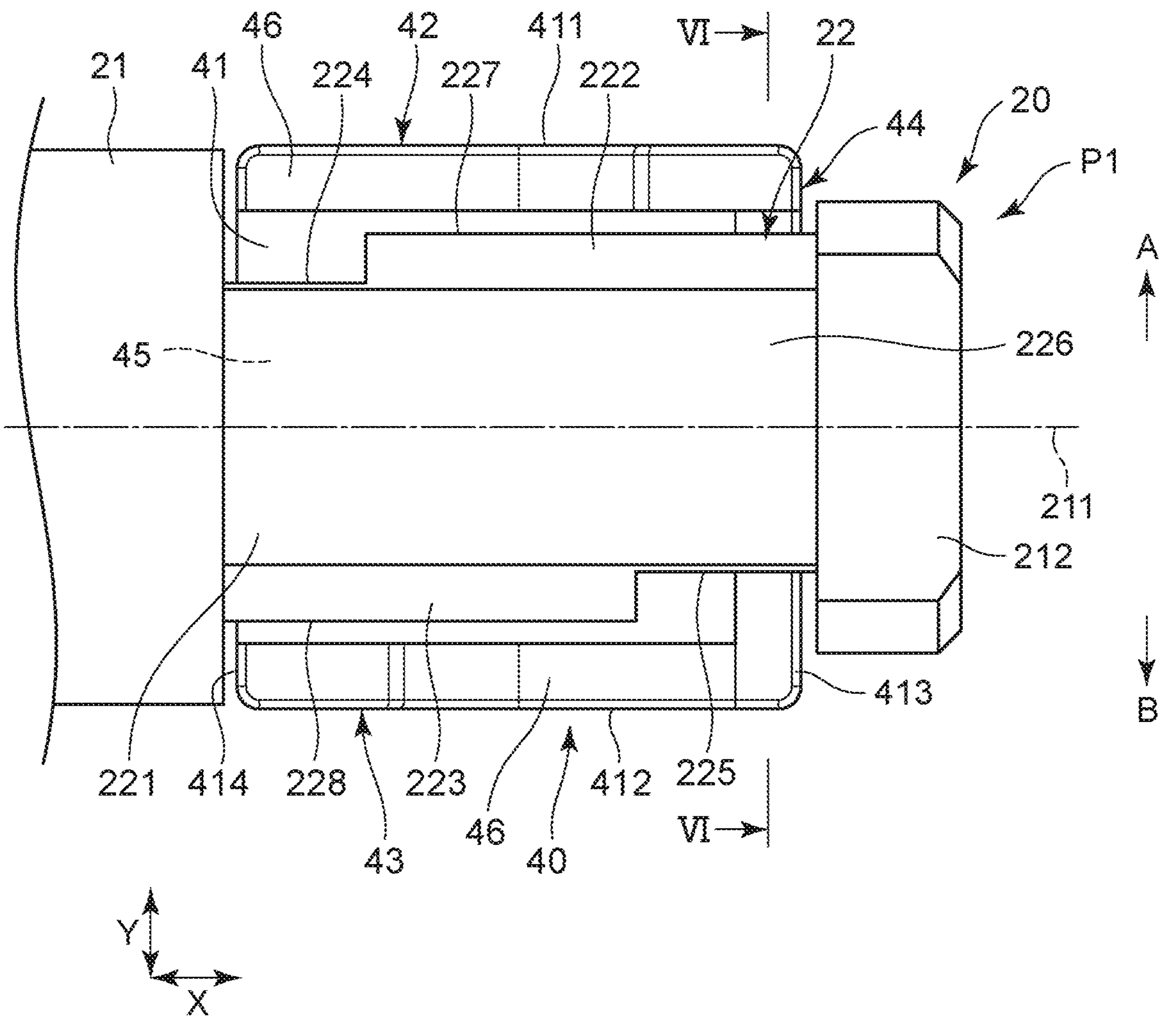
FIG. 4 is a plan view illustrating a cam and a plunger of the operation unit of FIG. 2.

As illustrated in FIG. 4, the cam 22 includes a cam body 221, a first protrusion 222, a second protrusion 223, a first cutout 224, and a second cutout 225. The first protrusion 222 and the second protrusion 223 are examples of at least one protrusion.

The cam body 221 is configured to be able to contact with the biasing member 30. In the present embodiment, as illustrated in FIG. 4, the cam body 221 has a substantially rectangular plate shape disposed in such a manner that a longitudinal direction thereof extends in the X direction and includes a contact surface 226 extending along the XY plane when the shaft body 21 is positioned at the return position P1. As illustrated in FIG. 3, the contact surface 226 is disposed to face the biasing member 30 in a second direction (e.g., in the Z direction) intersecting with the first direction X, and to be able to contact with the biasing member 30. When the shaft body 21 is located at the return position P1, most of the cam body 221 is disposed closer to the switch main body 2 than to the rotation axis 211 in the second direction (e.g., in the Z direction) intersecting with the first direction X.

As illustrated in FIG. 4, in a view in the second direction Z, the first protrusion 222 protrudes in a radial direction with respect to the rotation axis 211 (hereinafter, the direction is referred to as a radial direction) and in a direction moving away from the cam body 221, from one side of the cam body 221 in a third direction (e.g., in the Y direction) intersecting with the first direction X and the second direction Z. The first protrusion 222 is configured in such a manner that a leading edge 227 (an example of a first leading edge) that is far from the cam body 221 in the radial direction is able to contact with the plunger 40. In the present embodiment, the first protrusion 222 has a tapered shape and protrudes in the radial direction from the cam body 221 toward an end nearer to the first protrusion 222 (in FIG. 4, the upper end) of both ends of the plunger 40 in the third direction Y As illustrated in FIG. 4, in a view in the second direction Z, the second protrusion 223 protrudes in the radial direction and in the direction moving away from the cam body 221 from the other side of the cam body 221 in the third direction Y. The second protrusion 223 is configured in such a manner that a leading edge 228 that is far from the cam body 221 in the radial direction (an example of a second leading edge) is able to contact with the plunger 40. In the present embodiment, the second protrusion 223 has a tapered shape and protrudes in the radial direction from the cam body 221 toward an end nearer to the second protrusion 223 (in FIG. 4, the lower end) of both ends of the plunger 40 in the third direction Y.

As illustrated in FIG. 4, the first cutout 224 is disposed on an end of the first protrusion 222 in the first direction X and extends in the radial direction from the leading edge 227 of the first protrusion 222 toward the rotation axis 211. In the present embodiment, the first cutout 224 is provided to an end of the first protrusion 222 near the circumferential wall portion 12 in the first direction X. As illustrated in FIG. 4, the second cutout 225 is provided at an end of the second protrusion 223 in the first direction X which is positioned at an opposite side of the end of the first protrusion 222 and extends from the leading edge 228 of the second protrusion 223 toward the rotation axis 211. In the present embodiment, the second cutout 225 is provided to an end of the second protrusion 223 far from the circumferential wall portion 12 in the first direction X.

As illustrated in FIG. 3, the biasing member 30 is disposed farther from the switch main body 2 in the second direction Z than the cam 22, inside the housing 10. The biasing member 30 includes a coil spring 31 and a return plunger 32 disposed between the coil spring 31 and the cam 22. The coil spring 31 biases the cam 22 in the second direction Z and in a direction moving closer to the switch main body 2 to return the shaft body 21 to the return position P1. As an example, the return plunger 32 includes a communicating plate 321 that contacts with the cam body 221 and communicates the biasing force of the coil spring 31 to the cam 22, and a guide plate 322 that guides a movement of the communicating plate 321 along the second direction Z.

As illustrated in FIG. 3, the plunger 40 is disposed between the switch main body 2 and the cam 22 in the second direction Z, inside the housing 10. The plunger 40 is disposed in a manner facing the cam 22 in the second direction Z. The plunger 40 moves in the second direction Z by the rotation of the cam 22 and switches the switch main body 2 on and off In the present embodiment, as illustrated in FIG. 4, the plunger 40 includes a plunger body 41, a first contact portion 42, the second contact portion 43, a third contact portion 44, and a non-contact portion 45, and is configured to perform one-sided operation in which the cam 22 contacts therewith at the first operation position P2, but the cam 22 does not contact therewith at the second operation position P3. The first contact portion 42, the second contact portion 43, and the third contact portion 44 are examples of at least one contact portion.

Figure 5:
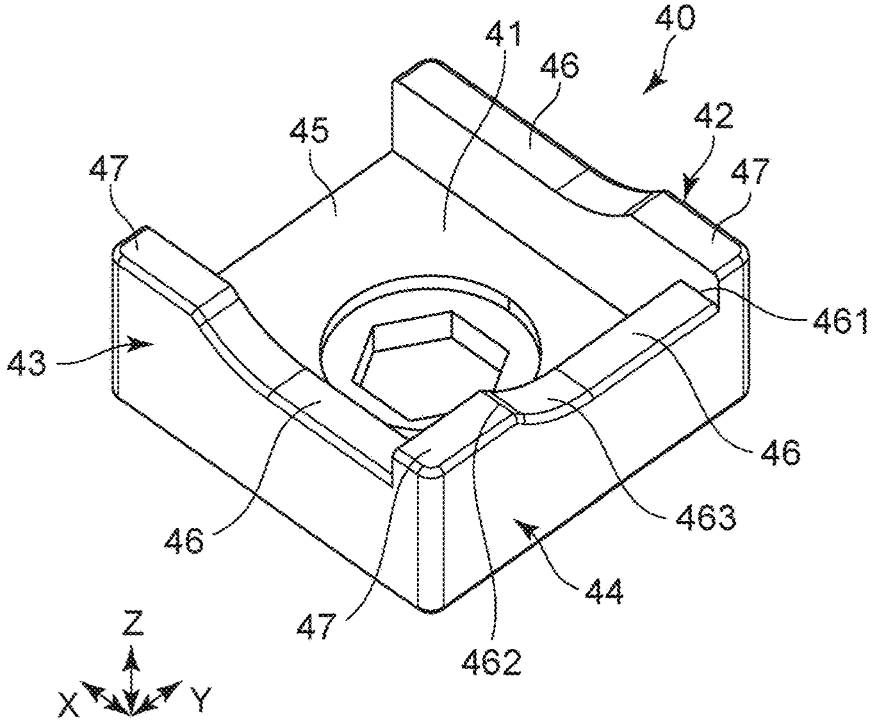
FIG. 5 is a perspective view illustrating the plunger of the operation unit of FIG. 2.

As an example, as illustrated in FIG. 5, the plunger body 41 has a substantially square plate shape, and one surface of the plunger body 41 in the thickness direction faces the cam 22 in the second direction Z.

As illustrated in FIG. 5, each of the first contact portion 42, the second contact portion 43, and the third contact portion 44 protrudes from the plunger body 41 toward the cam 22 in the second direction Z. Each of the first contact portion 42, the second contact portion 43, and the third contact portion 44 is configured to be contactable with the first protrusion 222 and the second protrusion 223. The non-contact portion 45 is configured to contact neither with the first protrusion 222 nor with the second protrusion 223. In the present embodiment, as illustrated in FIG. 5, the non-contact portion 45 is constituted by a recess capable of housing the first protrusion 222 and the second protrusion 223, the recess being surrounded by the first contact portion 42, the second contact portion 43, and the plunger body 41.

In the present embodiment, the first contact portion 42 and the second contact portion 43 are disposed in a manner facing each other with an interval therebetween in the third direction Y. The third contact portion 44 and the non-contact portion 45 are disposed in a manner facing each other with an interval therebetween in the first direction X. Specifically, as illustrated in FIG. 4, the plunger body 41 has a quadrangular shape including a first side 411 that is one of sides facing each other in the third direction Y, a second side 412 facing the first side 411 in the third direction Y, a third side 413 intersecting with the first side 411 and the second side 412, and a fourth side 414 facing the third side 413. The first contact portion 42 has a plate shape with a substantially rectangular cross section and is disposed in the first side 411 of the plunger body 41. The second contact portion 43 has a plate shape with a substantially rectangular cross section and is disposed in the second side 412 of the plunger body 41. The third contact portion 44 has a plate shape with a substantially rectangular cross section and is disposed in the third side 413 of the plunger body 41. The non-contact portion 45 is disposed in the fourth side 414 of the plunger body 41. One end of the first contact portion 42 in the first direction X is connected to one end of the third contact portion 44 in the third direction Y, and one end of the second contact portion 43 in the first direction X is connected to the other end of the third contact portion 44 in the third direction Y When the shaft body 21 is rotated from the return position P1 toward the first operation position P2 (that is, in the direction of the arrow A), the first protrusion 222 contacts with the third contact portion 44 and moves the plunger 40 in the second direction Z and in the direction moving closer to the switch main body 2 (hereinafter, it is referred to as an actuating direction). As a result, the switch main body 2 is switched from off to on. When the shaft body 21 is rotated from the return position P1 toward the second operation position P3 (that is, in the direction of the arrow B), the third contact portion 44 is housed in the second cutout 225, and the second protrusion 223 is housed in the non-contact portion 45. Even when the shaft body 21 is rotated in the direction of the arrow B, the plunger 40 does not move in the actuating direction, and the switch main body 2 remains off and is not switched on.

Figure 6:
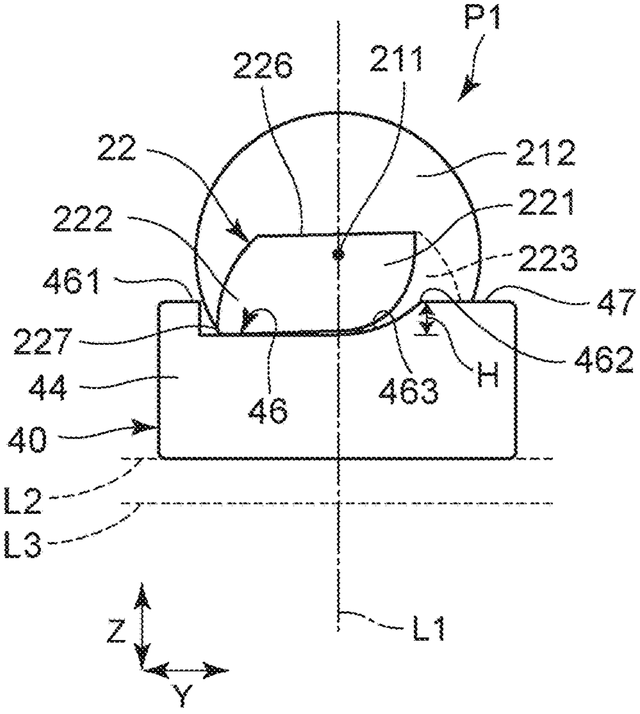
FIG. 6 is a first schematic for explaining a relationship between rotation of the shaft body and a position of the plunger of the limit switch of FIG. 1.

As illustrated in FIG. 6, each of the first contact portion 42, the second contact portion 43, and the third contact portion 44 includes a recess 46. The recess 46 is positioned on a facing surface 47 facing the first protrusion 222 and the second protrusion 223 in the second direction Z and is recessed in the second direction Z and in the direction moving closer to the switch main body 2. The recess 46 extends in a direction in which corresponding one of the first contact portion 42, the second contact portion 43, and the third contact portion 44 extends.

For example, the recess 46 of the third contact portion 44 extends in the third direction Y. As illustrated in FIG. 5, the recess 46 of the third contact portion 44 includes a first end 461, a second end 462, and an inclined surface 463.

Figure 8:
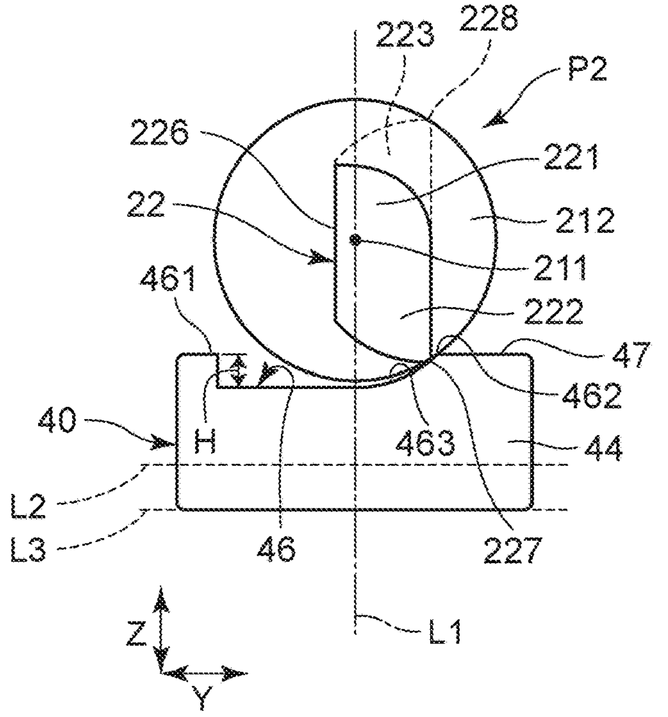
FIG. 8 is a third schematic for explaining the relationship between the rotation of the shaft body of the limit switch of FIG. 1 and the position of the plunger.

As illustrated in FIG. 6, when the shaft body 21 is at the return position P1, the first end 461 is positioned farther from a virtual straight line L1 that passes through the rotation axis 211 and extending in the second direction Z, than the leading edge 227 in the third direction Y. The second end 462 is positioned in such a manner that the virtual straight line L1 comes to a position between the second end 462 and the first end 461 in the third direction Y. In other words, the virtual straight line L1 is positioned between the first end 461 and the second end 462. As illustrated in FIG. 8, when the shaft body 21 is at the first operation position P2, the second end 462 is disposed farther from the virtual straight line L1 than the leading edge 227 in the third direction Y As illustrated in FIG. 6, the inclined surface 463 extends from the second end 462 toward the first end 461 in the third direction Y The inclined surface 463 is inclined in a direction moving closer to the switch main body 2 in the second direction Z, as the inclined surface 463 extends from the second end 462 toward the first end 461. In the present embodiment, as an example, the inclined surface 463 is a curved surface projecting in a direction moving closer to the switch main body 2 in the second direction Z and constitutes a part of a bottom surface of the recess 46.

When the shaft body 21 is rotated from the return position P1 toward the first operation position P2, the leading edge 227 of the first protrusion 222 moves from the first end 461 through the inclined surface 463 toward the second end 462, while being kept contact with the bottom surface of the recess 46.

Figure 7:
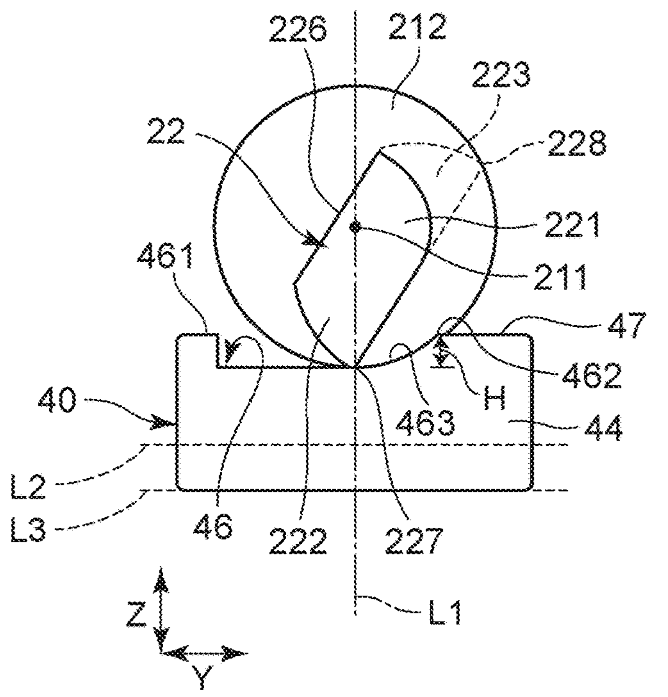
FIG. 7 is a second schematic for explaining the relationship between the rotation of the shaft body of the limit switch of FIG. 1 and the position of the plunger.

The inclined surface 463 is configured in such a manner that a height H in the second direction Z (that is, a linear distance between the bottom surface of the recess 46 and the opening) is equal to a distance between a position of the leading edge 227 (see FIG. 7) when the leading edge 227 is on the virtual straight line L1 and a position of the leading edge 227 when the shaft body 21 is at the first operation position P2, in the second direction Z. FIGS. 6 to 8 illustrate a virtual straight line L2 representing a position of the bottom surface of the plunger 40 when the shaft body 21 is at the return position P1, and a virtual straight line L3 representing a position of the bottom surface of the plunger 40 when the leading edge 227 of the first protrusion 222 is on the virtual straight line L1. As illustrated in FIG. 7, the leading edge 227 of the first protrusion 222 and the plunger 40 are nearest to the switch main body 2 in the second direction Z when the leading edge 227 is on the virtual straight line L1. As illustrated in FIG. 8, when the shaft body 21 is positioned at the first operation position P2, the bottom surface of the plunger 40 is positioned on the virtual straight line L3.

The limit switch 1 according to the present embodiment can exert advantageous effects such as those described below.

The limit switch 1 includes the switch main body 2 capable of being switched on and off, and the operation unit 3 connected to the switch main body. The operation unit 3 includes the housing 10, the shaft member 20, the biasing member 30, and the plunger 40. The shaft member 20 includes the shaft body 21 that extends from the outside of the housing 10 to the inside of the housing 10 along the first direction and is supported by the housing 10 in a manner rotatable from the return position P1 to the first operation position P2 around the rotation axis 211 extending in the first direction, and the cam 22 that is disposed on the shaft body 21 positioned inside the housing 10 and is rotated with the shaft body 21. The biasing member 30 is disposed inside the housing 10 and biases the cam 22 in the second direction and in the direction moving closer to the switch main body 2, to return the shaft body 21 to the return position P1. The plunger 40 is disposed between the switch main body 2 and the cam 22 in the second direction in the housing 10, in a manner facing the cam 22, and moves in the second directions as the cam 22 is rotated and switches the switch main body 2 on and off. The cam 22 includes the cam body 221 with which the biasing member 30 is brought into contact, and at least one protrusion. The at least one protrusion protrudes from the cam body 221 in a radial direction with respect to the rotation axis and in the direction moving away from the cam body 221. The leading edge that is separated from the cam body 221 in the radial direction is configured to be able to be brought into contact with the plunger 40. The plunger 40 includes the plunger body 41 that faces the cam 22 in the second direction, and at least one contact portion that protrudes from the plunger body 41 toward the cam 22 in the second direction, and that is configured to be able to be brought into contact with the at least one protrusion. The at least one contact portion has the recess 46 that is provided on a surface facing the at least one protrusion, that extends in the third direction, and that is recessed in the second direction and in the direction moving closer to the switch main body 2. The recess 46 has the first end 461, the second end 462, and the inclined surface 463. When the shaft body 21 is at the return position P1, the first end 461 is disposed farther from the virtual straight line L1 that passes through the rotation axis 211 and that extends in the second direction, than the leading edge of the at least one protrusion, in the third direction. The second end 462 is positioned in such a manner that the virtual straight line L1 is positioned between the second end 462 and the first end 461 in the third direction. When the shaft body 21 is at the first operation position P2, the second end 462 is positioned farther from the virtual straight line L1 than the leading edge of at least one protrusion is, in the third direction. The inclined surface 463 extends between the second end 462 and the first end 461 along the third direction. The inclined surface 463 is inclined in the direction moving closer to the switch main body 2 in the second direction, as the inclined surface 463 extends from the second end 462 toward the first end 461 in the third direction. With such a configuration, when the shaft body 21 is moved from the return position P1 to the first operation position P2, it is possible to keep the plunger 40 at the bottom dead center, even if the leading edge of the at least one protrusion that contacts with the plunger 40 moves from the bottom dead center in a direction moving closer to the rotation axis 211. As a result, it is possible to implement a limit switch that is stably operable.

Figure 11:
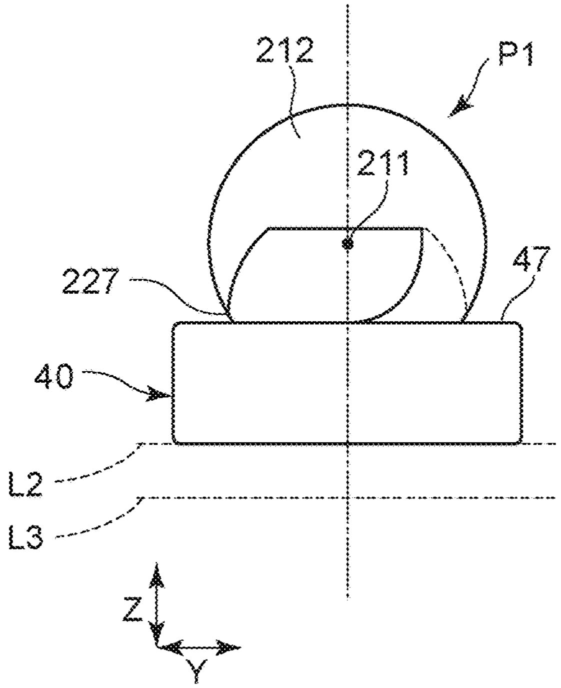
FIG. 11 is a first schematic for explaining a relationship between rotation of a shaft body and a position of a plunger included in a limit switch having no recess.
Figure 12:
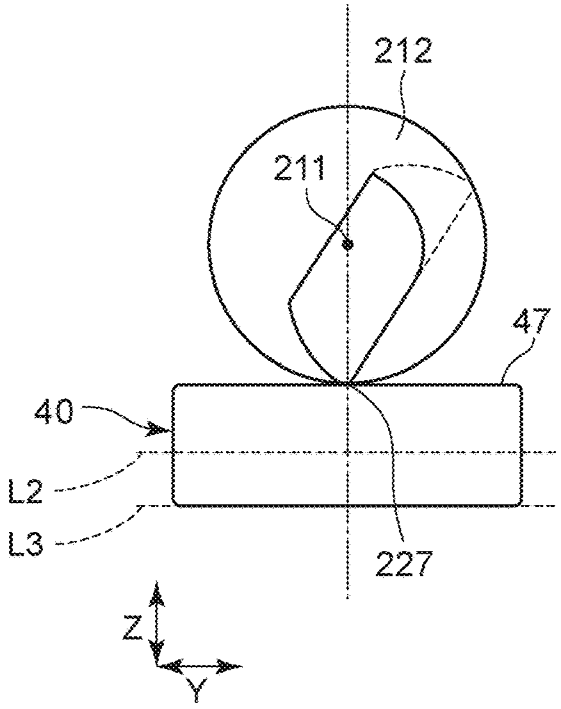
FIG. 12 is a second schematic for explaining the relationship between rotation of the shaft body and the position of the plunger included in the limit switch having no recess.
Figure 13:
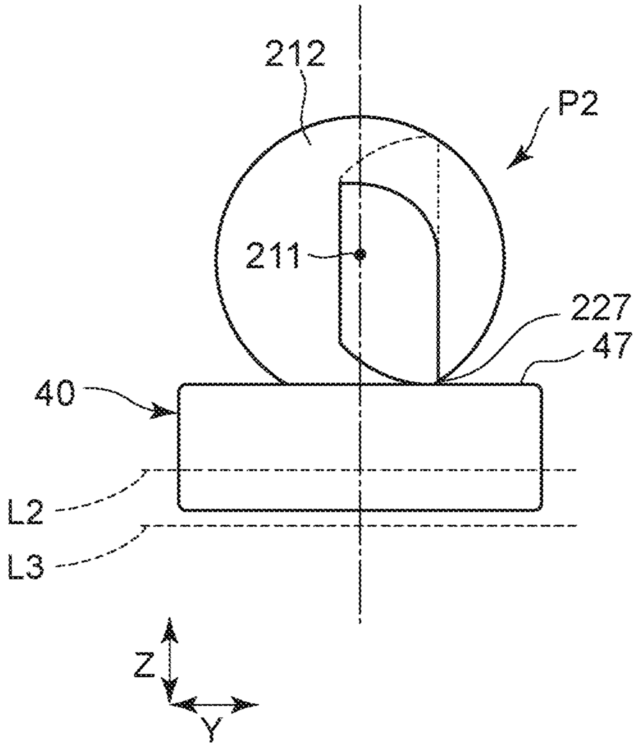
FIG. 13 is a third schematic for explaining a relationship between rotation of a shaft body and a position of a plunger included in a limit switch having no recess.

For example, in a limit switch including a plunger 40 in which a facing surface 47 is not provided with the recess 46, as illustrated in FIGS. 11 to 13, when the shaft body 21 is at the first operation position P2, the bottom surface of the plunger 40 is positioned closer to the rotation axis 211 than to the virtual straight line L3 and fails to maintain the plunger 40 at the bottom dead center.

The inclined surface 463 is a curved surface projecting in a direction moving closer to the switch main body 2 in the second direction. With such a configuration, the shaft body 21 can be rotated smoothly.

The inclined surface 463 is configured in such a manner that the height H in the second direction is equal to the distance between a position of the leading edge of the at least one protrusion when the leading edge is positioned on the virtual straight line L1 and a position of the leading edge of the at least one protrusion when the shaft body 21 is positioned at the first operation position P2, the distance being a distance in the second direction. With such a configuration, the plunger 40 can be kept at the bottom dead center more reliably.

The limit switch 1 can also be configured in the following manner.

The shaft body 21 is not limited to a configuration that is rotatable forwardly and backwardly around the rotation axis 211. For example, the shaft body 21 may be configured to be rotatable from the return position P1 to the first operation position P2 around the rotation axis 211, but not rotatable from the return position P1 to the second operation position P3. In such a configuration, the second protrusion 223, the first cutout 224, and the second cutout 225 may be omitted.

Figure 9:
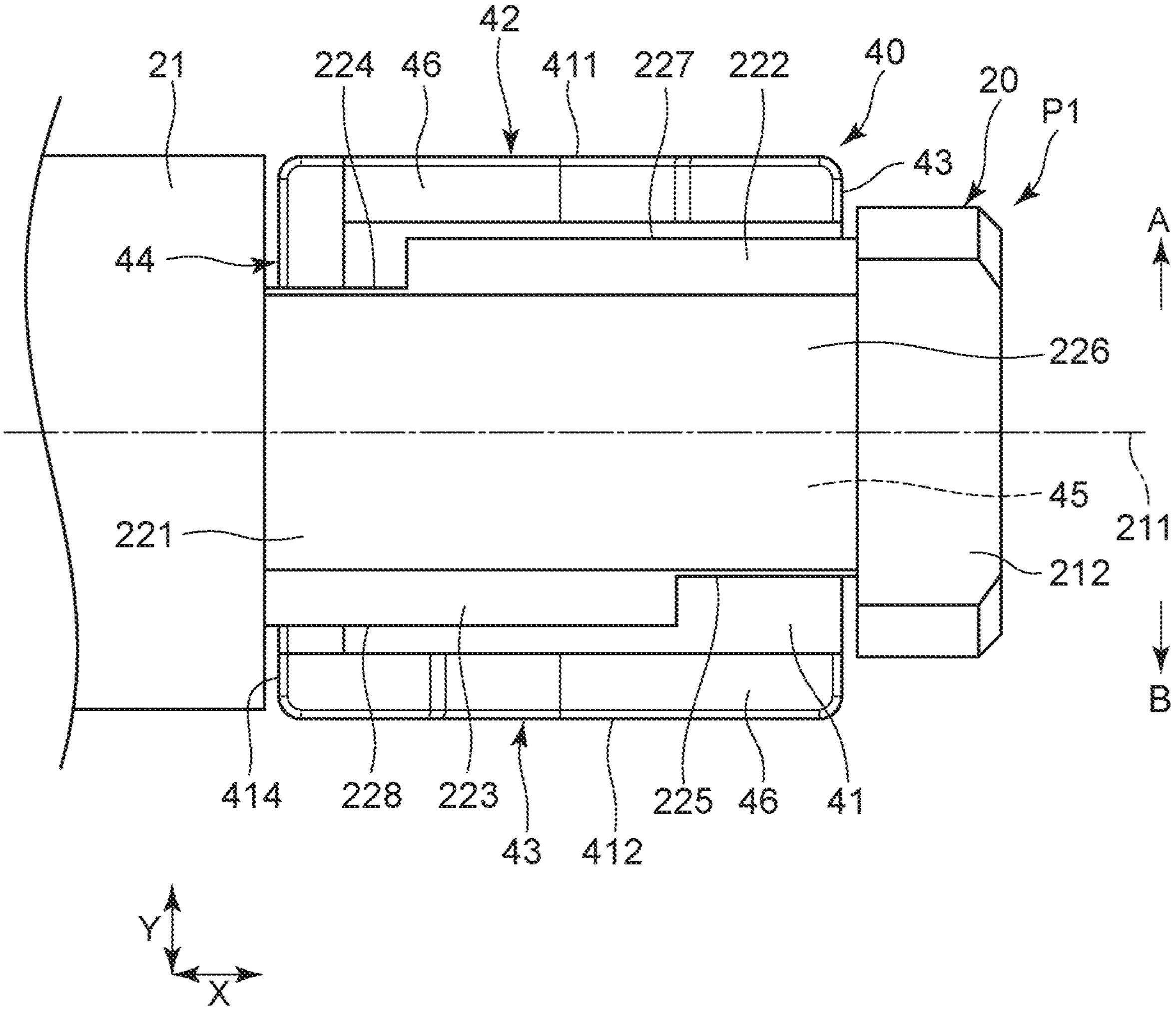
FIG. 9 is a plan view illustrating a first modification of the limit switch of FIG. 1.

The plunger is not limited to the configuration performing the one-sided operation where the cam 22 contacts with the plunger 40 at the first operation position P2 but does not contact with the plunger 40 at the second operation position P3. For example, as illustrated in FIG. 9, the third contact portion 44 may be positioned on the fourth side 414 of the plunger body 41, and the non-contact portion 45 may be positioned on the first side 411 of the plunger body 41. In such a configuration, when the shaft body 21 is rotated from the return position P1 to the second operation position P3 (that is, in the direction of the arrow B), the second protrusion 223 contacts with the third contact portion 44, and moves the plunger 40 in the second direction Z and in the direction moving closer to the switch main body 2 (hereinafter, it is referred to as the actuating direction). When the shaft body 21 is rotated from the return position P1 toward the first operation position P2 (that is, in the direction of the arrow A), the third contact portion 44 is housed in the first cutout 224, and the first protrusion 222 is housed in the non-contact portion 45. Even when the shaft body 21 is rotated in the direction of the arrow A, the plunger 40 does not move in the actuating direction, and the switch main body 2 remains off, without being switched on.

Thus, when the plunger 40 is positioned in the manner described below, an operation mode of the limit switch 1 is set to the one-sided operation. To implement the limit switch 1 capable of only one-sided operation, the first contact portion 42 and the second contact portion 43 may be omitted.

In the second direction Z, the plunger 40 is disposed in such a manner that the third contact portion 44 faces the first cutout 224 and the second protrusion 223, and the non-contact portion 45 faces the second cutout 225 and the first protrusion 222.

In the second direction Z, the plunger 40 is disposed in such a manner that the third contact portion 44 faces the second cutout 225 and the first protrusion 222, and the non-contact portion 45 faces the first cutout 224 and the second protrusion 223.

Figure 10:
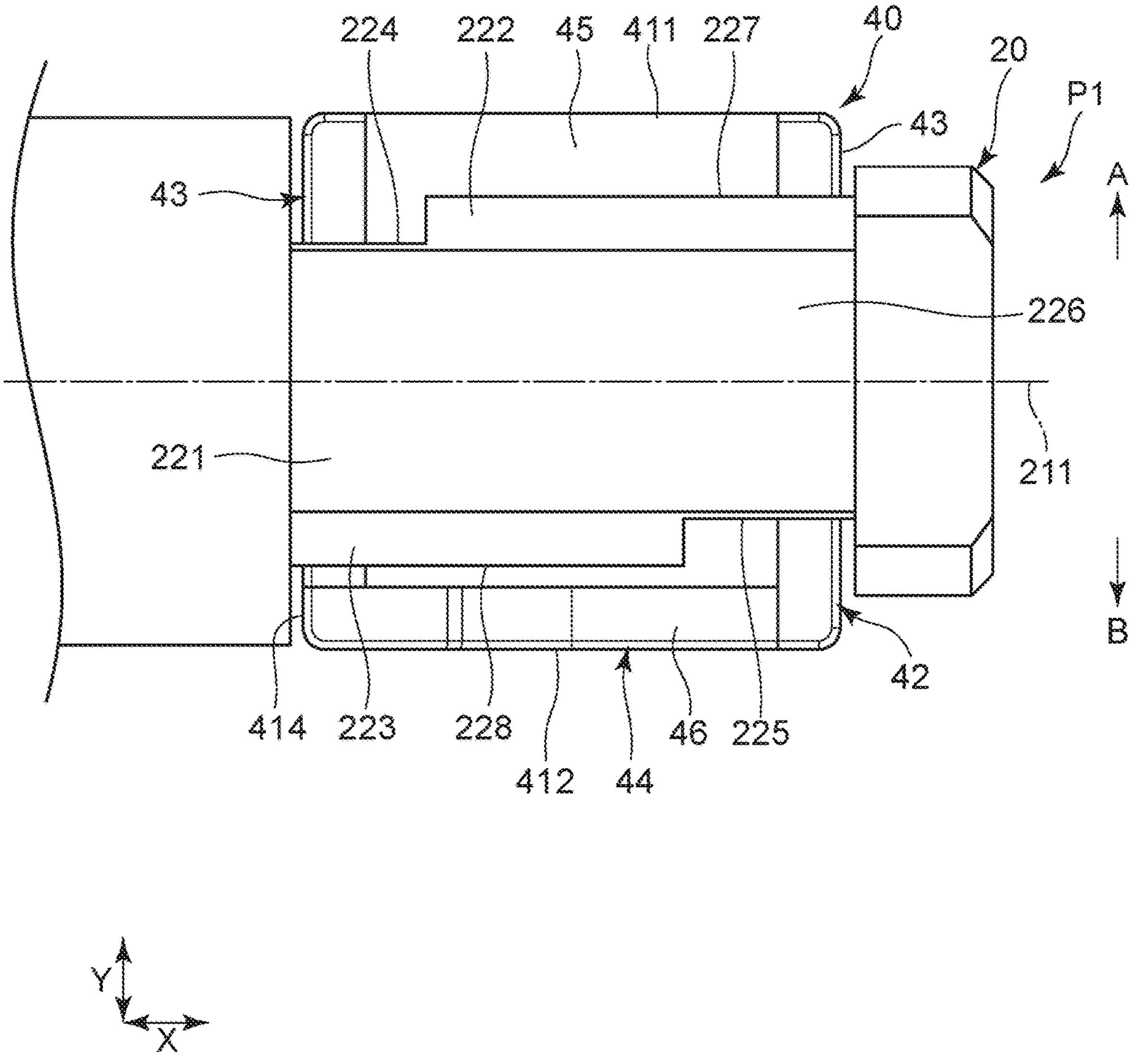
FIG. 10 is a plan view illustrating a second modification of the limit switch of FIG. 1.

For example, as illustrated in FIG. 10, the first contact portion 42 may be positioned in the third side 413, the second contact portion 43 may be disposed in the fourth side 414, and the third contact portion 44 may be disposed in the second side 412. In such a configuration, when the shaft body 21 is rotated in the direction of arrow A, the first protrusion 222 contacts with the first contact portion 42 and moves the plunger 40 in the actuating direction. When the shaft body 21 is rotated in the direction of arrow B, the second protrusion 223 contacts with the second contact portion 43 and moves the plunger 40 in the actuating direction.

Thus, when the plunger 40 is positioned in the manner described below, an operation mode of the limit switch 1 is set to the double-sided operation. To implement the limit switch 1 capable of only double-sided operation, the third contact portion 44 and the non-contact portion 45 may be omitted.

In the second direction Z, the plunger 40 is disposed in such a manner that the first contact portion 42 faces the second cutout 225 and the first protrusion 222, and the second contact portion 43 faces the first cutout 224 and the second protrusion 223.

In the second direction Z, the plunger 40 is positioned in such a manner that the first contact portion 42 faces the first cutout 224 and the second protrusion 223, and the second contact portion 43 faces the second cutout 225 and the first protrusion 222.

Based on the above, the plunger 40 may be configured to have an operation mode that is settable to one of the one-sided operations and the double-sided operation.

The inclined surface 463 is not limited to a curved surface, and may be a flat surface, for example.

The switch main body 2 may adopt any configuration capable of being switched on and off via the plunger 40 as the shaft body 21 is rotated.

The operation unit 3 may be connected detachably to the switch main body 2.

The circumferential wall portion 12 is not limited to a configuration provided integrally with the housing main body 11 and may be provided separately therefrom. In such a configuration, the circumferential wall portion 12 may be made of the same material as the housing main body 11 or may be made of a different material.

The shape and configuration of each member constituting the limit switch 1 according to the above embodiment are merely examples, and any other shape and configuration may also be adopted.

For example, the plunger body 41 is not limited to have a quadrangular shape in a view in the second direction Z. A shape of the plunger body 41 may be a polygonal or a circular shape in a view in the second direction Z.

For example, the non-contact portion 45 is not limited to a configuration surrounded by the first contact portion 42, the second contact portion 43, and the plunger body 41. The non-contact portion 45 may adopt any configuration that does not contact with the first protrusion 222 and the second protrusion 223 when the shaft body 21 is rotated.

Various embodiments of the present disclosure have been described above with reference to the drawings. Finally, various aspects of the present disclosure will be explained. In the following description, reference numerals are appended as an example.

A limit switch 1 according to a first aspect of the present disclosure includes:

a switch main body 2 capable of being switched on and off; and an operation unit 3 connected to the switch main body, wherein the operation unit 3 includes:

a housing 10, a shaft member 20 that includes a shaft body 21 extending in a first direction from outside of the housing 10 to inside of the housing 10 and supported by the housing 10 in a manner rotatable from a return position to an operation position around a rotation axis 211 that extends in the first direction, and a cam 22 that is disposed on the shaft body 21 positioned inside the housing 10 and that is rotated with the shaft body 21;

a biasing member 30 that is disposed inside the housing 10 and that biases the cam 22 in a second direction intersecting with the first direction and in a direction moving closer to the switch main body 2, to return the shaft body 21 to the return position; and a plunger 40 that is disposed in a manner facing the cam 22, between the switch main body 2 and the cam 22 in the second direction inside the housing 10 and that moves in the second direction as the cam 22 is rotated and switches the switch main body 2 on and off, the cam 22 includes:

a cam body 221 with which the biasing member 30 is in contact, at least one protrusion that protrudes from the cam body 221 in a radial direction with respect to the rotation axis 211 and in a direction moving away from the cam body 221, and that includes a leading edge separated from the cam body 221 in the radial direction and configured to be able to be brought into contact with the plunger 40, the plunger 40 includes:

a plunger body 41 that faces the cam 22 in the second direction; and at least one contact portion that protrudes from the plunger body 41 toward the cam 22 along the second direction and that is configured to be able to be brought into contact with the at least one protrusion, the at least one contact portion includes a recess 46 that is positioned on a facing surface 47 facing the at least one protrusion, that extends in a third direction intersecting with the first direction and the second direction, and that is recessed in the second direction and in a direction moving closer to the switch main body 2, and the recess 46 includes:

a first end 461 that is positioned separately from the leading edge in the third direction with respect to a virtual straight line L1 passing through the rotation axis 211 and extending in the second direction, when the shaft body 21 is at the return position, a second end 462 that is positioned in such a manner that the virtual straight line L1 comes to a position between the second end 462 and the first end 461 in the third direction, and that is positioned farther from the virtual straight line L1 than the leading edge in the third direction when the shaft body 21 is at the operation position; and an inclined surface 463 that extends from the second end 462 to the first end 461 in the third direction, and that is inclined in a direction moving closer to the switch main body 2 in the second direction as the inclined surface 463 extends from the second end 462 to the first end 461 in the third direction.

In a limit switch 1 according to a second aspect of the present disclosure, the inclined surface 463 is a curved surface projecting in a direction moving closer to the switch main body 2 in the second direction.

In a limit switch 1 according to a third aspect of the present disclosure, the inclined surface 463 is configured in such a manner that a height H in the second direction is equal to a distance between a position of the leading edge when the shaft body 21 is on the virtual straight line L1 and a position of the leading edge when the shaft body is positioned at the operation position, the distance being a distance in the second direction.

In a limit switch 1 according to a fourth aspect of the present disclosure, the shaft body 21 is supported by the housing 10 in a forwardly rotatable manner from the return position to a first operation position around the rotation axis 211, and in a reversely rotatable manner from the return position toward a second operation position that is opposite to the first operation position with respect to the return position, and the cam 22 includes:

a first protrusion 222 that in a view in the second direction, protrudes in the radial direction and in a direction moving away from the cam body 221, from one side (a first side) of the cam body 221 in the third direction, and in which a first leading edge 227 separated from the cam body 221 in the radial direction is configured to be able to contact with the plunger 40, a second protrusion 223 that in a view in the second direction, protrudes in the radial direction and in a direction moving away from the cam body 221 from the other side (a second side) of the cam body 221 in the third direction, and in which a second leading edge 228 separated from the cam body 221 in the radial direction is configured to be able to contact with the plunger 40, a first cutout 224 that is positioned on one end of the first protrusion 222 in the first direction and that extends from the first leading edge 227 of the first protrusion 222 toward the rotation axis 211: and a second cutout 225 that is positioned at the other end of the second protrusion 223 in the first direction which is positioned at an opposite side of the end of the first protrusion 222 and that extends from the second leading edge 228 of the second protrusion 223 toward the rotation axis 211, the plunger 40 includes:

a contact portion 44 that protrudes from the plunger body 41 toward the cam 22 in the second direction, and that is disposed to be able to be housed in the first cutout 224 and to be able to contact with the second protrusion 223, or to be able to be housed in the second cutout 225 and to be able to contact with the first protrusion 222; and a non-contact portion 45 that is positioned with an interval with respect to the contact portion 44 in the first direction, the non-contact portion 45 not contacting with the first protrusion 222 and the second protrusion 223, and in the second direction, the contact portion 44 faces the first cutout 224 and the second protrusion 223, and the non-contact portion 45 faces the second cutout 225 and the first protrusion 222, or the contact portion 44 faces the second cutout 225 and the first protrusion 222, and the non-contact portion 45 faces the first cutout 224 and the second protrusion 223.

In a limit switch 1 according to a fifth aspect of the present disclosure, the shaft body 21 is supported by the housing 10 in a forward rotatable manner from the return position toward a first operation position around the rotation axis 211, and in a reversely rotatable manner from the return position toward a second operation position opposite to the first operation position with respect to the return position, the cam 22 includes:

a first protrusion 222 that in a view in the second direction, protrudes in the radial direction and in a direction moving away from the cam body 221, from one side (a first side) of the cam body 221 in the third direction, and in which a first leading edge 227 separated from the cam body 221 in the radial direction is configured to be able to contact with the plunger 40, a second protrusion 223 that in a view in the second direction, protrudes in the radial direction and in a direction moving away from the cam body 221 from the other side (a second side) of the cam body 221 in the third direction, and in which a second leading edge 228 separated from the cam body 221 in the radial direction is configured to be able to contact with the plunger 40, a first cutout 224 that is positioned on an end of the first protrusion 222 in the first direction and that extends from the first leading edge 227 of the first protrusion 222 toward the rotation axis 211; and a second cutout 225 that is positioned at an end of the second protrusion 223 in the first direction which is positioned at an opposite side of the end of the first protrusion 222 and that extends from the second leading edge 228 of the second protrusion 223 toward the rotation axis 211, the plunger 40 includes:

a first contact portion 42 that protrudes from the plunger body 41 toward the cam 22 in the second direction, and that positioned to be able to be housed in the first cutout 224 and to be able to contact with the second protrusion 223; and a second contact portion 43 that is disposed with an interval with respect to the first contact portion 42 in the first direction, that protrudes from the plunger body 41 toward the cam 22 in the second direction, and that is positioned to be able to be housed in the second cutout 225 and to be able to contact with the first protrusion 222.

By using an appropriate combination of any of the embodiments and modifications, it is possible to achieve the advantageous effects corresponding thereto. In addition, any combinations of embodiments, combinations of examples, or combinations of embodiments and examples are possible, and combinations of features across different embodiments or examples are also possible.

Although the present disclosure has been fully described in connection with preferred embodiments with reference to the accompanying drawings, various changes and modifications thereof will also be apparent to those skilled in the art. Such variations and modifications are to be understood as falling within the scope of the present disclosure, as set forth in the appended claims.

The limit switch according to the present disclosure is applicable to an assembly line of automobiles or the like, for example.

REFERENCE SIGNS LIST

1 limit switch
2 switch main body
3 operation unit
10 housing
11 housing main body
12 circumferential wall portion
13 bearing
14 housing space
15 recess
20 shaft member
21 shaft body
211 rotation axis
212 end
22 cam
221 cam body
222 first protrusion
223 second protrusion
224 first cutout
225 second cutout
226 contact surface
227, 228 tip
30 biasing member
31 coil spring
32 return plunger
321 communicating plate
322 guide plate
40 plunger
41 plunger body
411 first side
412 second side
413 third side
414 fourth side
42 first contact portion
43 second contact portion
44 third contact portion
45 non-contact portion
46 recess
461, 462 end
463 inclined surface
47 facing surface
50 operation lever

What is claimed is:

1. A limit switch, comprising:

a switch main body configured to be switched on and off; and an operation unit connected to the switch main body, wherein the operation unit includes:

a housing;

a shaft member that includes a shaft body extending in a first direction from outside of the housing to inside of the housing and supported by the housing in a manner rotatable from a return position to an operation position around a rotation axis that extends in the first direction, and a cam that is disposed on the shaft body positioned inside the housing and that is rotated with the shaft body;

a biasing member that is disposed inside the housing and that applies a biasing force to the cam in a second direction intersecting with the first direction and in a direction moving closer to the switch main body, to bring the shaft body back to the return position; and a plunger that is disposed in a manner facing the cam, between the switch main body and the cam in the second direction inside the housing and that moves in the second direction as the cam is rotated and switches the switch main body on and off, the cam includes:

a cam body with which the biasing member is in contact;

at least one protrusion that protrudes from the cam body in a radial direction with respect to the rotation axis and in a direction moving away from the cam body, and that includes a leading edge separated from the cam body in the radial direction and configured to be able to be brought into contact with the plunger, the plunger includes:

a plunger body that faces the cam in the second direction; and at least one contact portion that protrudes from the plunger body toward the cam along the second direction and that is configured to be able to be brought into contact with the at least one protrusion, the at least one contact portion includes a recess that is positioned on a facing surface facing the at least one protrusion, that extends in a third direction intersecting with the first direction and the second direction, and that is recessed in the second direction and in the direction moving closer to the switch main body, and the recess includes:

a first end that is positioned separately from the leading edge in the third direction with respect to a virtual straight line passing through the rotation axis and extending in the second direction, when the shaft body is at the return position;

a second end that is positioned in such a manner that the virtual straight line comes to a position between the second end and the first end in the third direction, and that is positioned farther from the virtual straight line than the leading edge in the third direction when the shaft body is at the operation position; and an inclined surface that extends from the second end to the first end in the third direction, and that is inclined in the direction moving closer to the switch main body in the second direction as the inclined surface extends from the second end to the first end in the third direction.

2. The limit switch according to claim 1, wherein the inclined surface is a curved surface projecting in the direction moving closer to the switch main body in the second direction.

3. The limit switch according to claim 2, wherein the inclined surface is configured in such a manner that a height in the second direction is equal to a distance between a position of the leading edge when the shaft body is on the virtual straight line and a position of the leading edge when the shaft body is positioned at the operation position, the distance being a distance in the second direction.

4. The limit switch according to claim 2, wherein the shaft body is supported by the housing in a forwardly rotatable manner from the return position to a first operation position around the rotation axis, and in a reversely rotatable manner from the return position toward a second operation position that is opposite to the first operation position with respect to the return position, and the cam includes:

a first protrusion that in a view in the second direction, protrudes in the radial direction and in the direction moving away from the cam body, from a first side of the cam body in the third direction, and in which a first leading edge separated from the cam body in the radial direction is configured to be able to contact with the plunger;

a second protrusion that in a view in the second direction, protrudes in the radial direction and in the direction moving away from the cam body, from a second side of the cam body in the third direction, and in which a second leading edge separated from the cam body in the radial direction is configured to be able to contact with the plunger;

a first cutout that is positioned on an end of the first protrusion in the first direction and that extends from the first leading edge of the first protrusion toward the rotation axis; and a second cutout that is positioned at an end of the second protrusion in the first direction which is positioned at an opposite side of the end of the first protrusion and that extends from the second leading edge of the second protrusion toward the rotation axis, the plunger includes:

a contact portion that protrudes from the plunger body toward the cam in the second direction, and that is disposed to be able to be housed in the first cutout and to be able to contact with the second protrusion, or to be able to be housed in the second cutout and to be able to contact with the first protrusion; and a non-contact portion that is positioned with an interval with respect to the contact portion in the first direction, the non-contact portion not contacting with the first protrusion and the second protrusion, and in the second direction, the contact portion faces the first cutout and the second protrusion, and the non-contact portion faces the second cutout and the first protrusion, or the contact portion faces the second cutout and the first protrusion, and the non-contact portion faces the first cutout and the second protrusion.

5. The limit switch according to claim 2, wherein the shaft body is supported by the housing in a forward rotatable manner from the return position toward a first operation position around the rotation axis, and in a reversely rotatable manner from the return position toward a second operation position opposite to the first operation position with respect to the return position, the cam includes:

a first protrusion that in a view in the second direction, protrudes in the radial direction and in the direction moving away from the cam body, from a first side of the cam body in the third direction, and in which a first leading edge separated from the cam body in the radial direction is configured to be able to contact with the plunger;

a second protrusion that in a view in the second direction, protrudes in the radial direction and in the direction moving away from the cam body, from a second side of the cam body in the third direction, and in which a second leading edge separated from the cam body in the radial direction is configured to be able to contact with the plunger;

a first cutout that is positioned on an end of the first protrusion in the first direction and that extends from the first leading edge of the first protrusion toward the rotation axis; and a second cutout that is positioned at an end of the second protrusion in the first direction which is positioned at an opposite side of the end of the first protrusion and that extends from the second leading edge of the second protrusion toward the rotation axis, the plunger includes:

a first contact portion that protrudes from the plunger body toward the cam in the second direction, and that positioned to be able to be housed in the first cutout and to be able to contact with the second protrusion; and a second contact portion that is disposed with an interval with respect to the first contact portion in the first direction, that protrudes from the plunger body toward the cam in the second direction, and that is positioned to be able to be housed in the second cutout and to be able to contact with the first protrusion.

6. The limit switch according to claim 1, wherein the inclined surface is configured in such a manner that a height in the second direction is equal to a distance between a position of the leading edge when the shaft body is on the virtual straight line and a position of the leading edge when the shaft body is positioned at the operation position, the distance being a distance in the second direction.

7. The limit switch according to claim 6, wherein the shaft body is supported by the housing in a forwardly rotatable manner from the return position to a first operation position around the rotation axis, and in a reversely rotatable manner from the return position toward a second operation position that is opposite to the first operation position with respect to the return position, and the cam includes:

a first protrusion that in a view in the second direction, protrudes in the radial direction and in the direction moving away from the cam body, from a first side of the cam body in the third direction, and in which a first leading edge separated from the cam body in the radial direction is configured to be able to contact with the plunger;

a second protrusion that in a view in the second direction, protrudes in the radial direction and in the direction moving away from the cam body, from a second side of the cam body in the third direction, and in which a second leading edge separated from the cam body in the radial direction is configured to be able to contact with the plunger;

a first cutout that is positioned on an end of the first protrusion in the first direction and that extends from the first leading edge of the first protrusion toward the rotation axis; and a second cutout that is positioned at an end of the second protrusion in the first direction which is positioned at an opposite side of the end of the first protrusion and that extends from the second leading edge of the second protrusion toward the rotation axis, the plunger includes:

a contact portion that protrudes from the plunger body toward the cam in the second direction, and that is disposed to be able to be housed in the first cutout and to be able to contact with the second protrusion, or to be able to be housed in the second cutout and to be able to contact with the first protrusion; and a non-contact portion that is positioned with an interval with respect to the contact portion in the first direction, the non-contact portion not contacting with the first protrusion and the second protrusion, and in the second direction, the contact portion faces the first cutout and the second protrusion, and the non-contact portion faces the second cutout and the first protrusion, or the contact portion faces the second cutout and the first protrusion, and the non-contact portion faces the first cutout and the second protrusion.

8. The limit switch according to claim 6, wherein the shaft body is supported by the housing in a forward rotatable manner from the return position toward a first operation position around the rotation axis, and in a reversely rotatable manner from the return position toward a second operation position opposite to the first operation position with respect to the return position, the cam includes:

a first protrusion that in a view in the second direction, protrudes in the radial direction and in the direction moving away from the cam body, from a first side of the cam body in the third direction, and in which a first leading edge separated from the cam body in the radial direction is configured to be able to contact with the plunger;

a second protrusion that in a view in the second direction, protrudes in the radial direction and in the direction moving away from the cam body, from a second side of the cam body in the third direction, and in which a second leading edge separated from the cam body in the radial direction is configured to be able to contact with the plunger;

a first cutout that is positioned on an end of the first protrusion in the first direction and that extends from the first leading edge of the first protrusion toward the rotation axis; and a second cutout that is positioned at an end of the second protrusion in the first direction which is positioned at an opposite side of the end of the first protrusion and that extends from the second leading edge of the second protrusion toward the rotation axis, the plunger includes:

a first contact portion that protrudes from the plunger body toward the cam in the second direction, and that positioned to be able to be housed in the first cutout and to be able to contact with the second protrusion; and a second contact portion that is disposed with an interval with respect to the first contact portion in the first direction, that protrudes from the plunger body toward the cam in the second direction, and that is positioned to be able to be housed in the second cutout and to be able to contact with the first protrusion.

9. The limit switch according to claim 1, wherein the shaft body is supported by the housing in a forwardly rotatable manner from the return position to a first operation position around the rotation axis, and in a reversely rotatable manner from the return position toward a second operation position that is opposite to the first operation position with respect to the return position, and the cam includes:

a first protrusion that in a view in the second direction, protrudes in the radial direction and in the direction moving away from the cam body, from a first side of the cam body in the third direction, and in which a first leading edge separated from the cam body in the radial direction is configured to be able to contact with the plunger;

a second protrusion that in a view in the second direction, protrudes in the radial direction and in the direction moving away from the cam body, from a second side of the cam body in the third direction, and in which a second leading edge separated from the cam body in the radial direction is configured to be able to contact with the plunger;

a first cutout that is positioned on an end of the first protrusion in the first direction and that extends from the first leading edge of the first protrusion toward the rotation axis; and a second cutout that is positioned at an end of the second protrusion in the first direction which is positioned at an opposite side of the end of the first protrusion and that extends from the second leading edge of the second protrusion toward the rotation axis, the plunger includes:

a contact portion that protrudes from the plunger body toward the cam in the second direction, and that is disposed to be able to be housed in the first cutout and to be able to contact with the second protrusion, or to be able to be housed in the second cutout and to be able to contact with the first protrusion; and a non-contact portion that is positioned with an interval with respect to the contact portion in the first direction, the non-contact portion not contacting with the first protrusion and the second protrusion, and in the second direction, the contact portion faces the first cutout and the second protrusion, and the non-contact portion faces the second cutout and the first protrusion, or the contact portion faces the second cutout and the first protrusion, and the non-contact portion faces the first cutout and the second protrusion.

10. The limit switch according to claim 1, wherein the shaft body is supported by the housing in a forward rotatable manner from the return position toward a first operation position around the rotation axis, and in a reversely rotatable manner from the return position toward a second operation position opposite to the first operation position with respect to the return position, the cam includes:

a first protrusion that in a view in the second direction, protrudes in the radial direction and in the direction moving away from the cam body, from a first side of the cam body in the third direction, and in which a first leading edge separated from the cam body in the radial direction is configured to be able to contact with the plunger;

a second protrusion that in a view in the second direction, protrudes in the radial direction and in the direction moving away from the cam body, from a second side of the cam body in the third direction, and in which a second leading edge separated from the cam body in the radial direction is configured to be able to contact with the plunger;

a first cutout that is positioned on an end of the first protrusion in the first direction and that extends from the first leading edge of the first protrusion toward the rotation axis; and a second cutout that is positioned at an end of the second protrusion in the first direction which is positioned at an opposite side of the end of the first protrusion and that extends from the second leading edge of the second protrusion toward the rotation axis, the plunger includes:

a first contact portion that protrudes from the plunger body toward the cam in the second direction, and that positioned to be able to be housed in the first cutout and to be able to contact with the second protrusion; and a second contact portion that is disposed with an interval with respect to the first contact portion in the first direction, that protrudes from the plunger body toward the cam in the second direction, and that is positioned to be able to be housed in the second cutout and to be able to contact with the first protrusion.

* * * * *